United States Patent
Lee

(10) Patent No.: US 7,453,053 B2
(45) Date of Patent: Nov. 18, 2008

(54) OPTICAL OUTPUT CONTROLLER WITH CONTROL BASED UPON AN OUTPUT CURRENT OF PARALLEL CURRENT CONTROLLING ELEMENTS

(75) Inventor: Yu-yong Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 11/159,190

(22) Filed: Jun. 23, 2005

(65) Prior Publication Data
US 2005/0285015 A1 Dec. 29, 2005

(30) Foreign Application Priority Data
Jun. 24, 2004 (KR) ............... 10-2004-0047831

(51) Int. Cl.
*G01J 1/32* (2006.01)
*G01J 1/44* (2006.01)

(52) U.S. Cl. .................. 250/205; 250/214 R
(58) Field of Classification Search .......... 250/205, 250/214 R, 214 A, 214.1; 362/276; 372/29.01, 372/29.011, 290.012, 29.014, 29.015, 29.021, 372/29.022, 30–32, 38.01, 38.02; 327/514
See application file for complete search history.

(56) References Cited

U.S. PATENT DOCUMENTS

| | | | |
|---|---|---|---|
| 4,107,463 A | 8/1978 | Pearson | 369/91 |
| 4,135,590 A | 1/1979 | Gaulder | 381/94.3 |
| 4,674,093 A * | 6/1987 | Angerstein et al. | 372/29.011 |
| 5,371,354 A * | 12/1994 | Domon et al. | 250/214 R |
| 5,402,432 A * | 3/1995 | Chou | 372/31 |
| 5,636,233 A * | 6/1997 | Sato et al. | 372/31 |
| 5,696,750 A | 12/1997 | Katayama | 369/112 |
| 5,856,965 A | 1/1999 | Tsuchiya et al. | 369/58 |
| 5,930,214 A | 7/1999 | Kasahara et al. | 369/58 |
| 5,940,360 A | 8/1999 | Choi | 369/112 |

(Continued)

FOREIGN PATENT DOCUMENTS

JP 08-162699 6/1996

(Continued)

OTHER PUBLICATIONS

U.S. Appl. No. 11/413,093, filed Apr. 28, 2006, Pyong-yong Seong, et al., Samsung Electronics Co., Ltd.

*Primary Examiner*—Que T. Le
*Assistant Examiner*—Pascal M Bui-Pho
(74) *Attorney, Agent, or Firm*—Staas & Halsey LLP

(57) ABSTRACT

An optical output controller including a light source emitting light, a light receiving unit receiving some of the emitted light and converting the received light into a current signal, and an automatic power controlling unit receiving the current of the light receiving unit and controlling an optical power output of the light source in accordance with the received current, wherein the automatic power controlling unit includes a resistance circuit section having a variable resistor of which one end is connected to an output end of the light receiving unit, a resistor connected in parallel with the variable resistor, and a load resistor connected in series to the variable resistor and a node providing a predetermined voltage, and a comparison circuit section controlling a driving current of the light source by comparing an output current of the resistance circuit section with a predetermined signal.

7 Claims, 2 Drawing Sheets

U.S. PATENT DOCUMENTS

| | | | |
|---|---|---|---|
| 5,995,473 A | 11/1999 | Choi | 369/58 |
| 6,026,068 A | 2/2000 | Obata et al. | 369/53 |
| 6,442,124 B1 | 8/2002 | Chung et al. | 369/112.07 |
| 6,643,303 B2 * | 11/2003 | Ito et al. | 372/38.02 |
| 2001/0020670 A1 * | 9/2001 | Hyoga | 250/205 |
| 2002/0018419 A1 | 2/2002 | Watabe | 369/53.26 |
| 2003/0076770 A1 | 4/2003 | Hashimoto | 369/120 |
| 2004/0079866 A1 * | 4/2004 | Nishiyama | 250/214 R |

FOREIGN PATENT DOCUMENTS

| | | |
|---|---|---|
| JP | 2001-244555 | 9/2001 |
| KR | U1989-0003242 | 4/1989 |
| KR | U1990-0017894 | 10/1990 |
| KR | 1999-019811 | 3/1999 |
| KR | U2000-0014427 | 7/2000 |
| KR | 10-2004-0000050 | 1/2004 |

* cited by examiner

OPTICAL OUTPUT CONTROLLER WITH CONTROL BASED UPON AN OUTPUT CURRENT OF PARALLEL CURRENT CONTROLLING ELEMENTS

CROSS-REFERENCE TO RELATED APPLICATIONS

This application claims the benefit of Korean Patent Application No. 10-2004-0047831, filed on Jun. 24, 2004, in the Korean Intellectual Property Office, the disclosure of which is incorporated herein in its entirety by reference.

BACKGROUND OF THE INVENTION

1. Field of the Invention

Embodiments of the present invention relate to an optical device, and more particularly, to an optical output control device.

2. Description of the Related Art

In general, optical devices are very vulnerable to excessive changes in current. Laser diodes that are currently being developed are primarily used in optical devices, commonly for laser printers. Different models of laser diodes have different optical power output. Even when laser diodes are rated as having the same optical power, if the manufacturers of the laser diodes are different, circuits for monitoring the output power of the laser diodes may also be different. Such differences in monitoring circuits are standing in the way of standardizing and simplifying optical power monitoring circuits.

FIG. 1 is a general block diagram of a light control and feedback circuit. Referring to FIG. 1, the circuit includes an optical power monitor 100 monitoring light emitted from a laser diode and converting the monitored light into a current, a variable resistance for optical power control 120 controlling the size of the current, an optical power compensating unit 140 compensating for an optical power using the current whose size has been controlled by the variable resistance 120, and an operational current varying unit 160 increasing or decreasing the operational current supplied to the laser diode, according to a result of the optical power compensating unit 140.

FIG. 2 is a block diagram illustrating a conventional configuration of an optical output controller. As illustrated in FIG. 2, the conventional optical output controller includes a laser diode 200 emitting laser light, a photodiode 210, which is a photo detector sensor, receiving monitoring light from the laser diode 200 and converting the received light into a current signal, and an automatic power controlling unit (APC) 220 controlling a light power supplied to the laser diode 200 in accordance with a feedback current from the photodiode 210.

In FIG. 2, an output current of the photodiode 210 is input into the automatic power controlling unit 220 to control an output power of the laser diode. To control an amount of the feedback current supplied to the automatic power controlling unit 220, for controlling the output power of the laser diode, a resistance circuit can be utilized. The resistance circuit can include a load resistance (RA) to protect the laser diode from overly large variations in current, caused by a variable resistor (VR), static electricity, and so on.

As shown in FIG. 2, the optical output controller obtains information necessary to control the output of light from the laser diode in a predetermined direction toward a desired optical system, from some of the light detected by the photodiode 210. The photodiode 21 can include a light intensity sensor checking a state of the light source power. In addition, if necessary, the optical output controller can control an optical power by controlling the amount of driving current supplied to the laser diode 200. In particular, since a variable resistance device capable of manually controlling optical power is attached to a feedback resistance circuit, controlling the optical power, the feedback resistance circuit can control the initial light intensity setting, e.g., during manufacturing of the optical output controller, by controlling the variable resistance device.

That is, by controlling an amount of monitoring current flowing through a variable resistance (VR), the amount of feedback current can be changed, and thus, the amount of operating current supplied to a semiconductor laser can be changed.

Meanwhile, in the optical output controller of a conventional optical device, if optical power specifications of a laser printer model are changed, a value of the variable resistance or fixed resistance should accordingly also be changed. This means that a new circuit should be formed and tested, which increases manufacturing costs. In other Words, the maximum variable range of the variable resistance changes according to the optical power specifications, for proper operation of a semiconductor laser. Thus when the specifications of a semiconductor laser, and the manufacturers of its components, are changed, a variable resistance also has to be changed, which is inconvenient. Further, even components having identical optical power specifications cannot be directly exchanged with one another due to a range of differences between variable resistances caused by different monitoring current ranges for an optical power.

Meanwhile, during the manufacture of the optical output controller, an operator controls the variable resistor of the optical output controller manually such that the optical device outputs a required optical power. Here, the variable resistor is very sensitive to manual handling. That is, the operator intends to maintain a required optical power by manually controlling the variable resistor. However, if the operator rotates the variable resistor more than necessary, an excessive current may be temporarily applied, and thereby an optical device, such as a laser diode (LD), can be damaged. Such damage is usually not serious enough to be detected when a laser printer, including the optical output controller, is shipped, however, as the laser printer operates, degradation of the included optical device occurs, which eventually results in deterioration of the laser printer.

SUMMARY OF THE INVENTION

Embodiments of the present invention include an optical output controller capable of simplifying a variable resistance while compensating an optical power in real time by monitoring the optical power.

To achieve the above and/or other aspects and advantages, embodiments of the present invention include an optical output controller including a light source, a light receiving unit detecting light emitted from the light source and converting the detected light into a current signal, and an automatic power controlling unit receiving current from the light receiving unit and controlling an optical power output of the light source in accordance with the received current, wherein the automatic power controlling unit includes a resistance circuit section having a variable resistor connected to an output end of the light receiving unit, a resistor connected in parallel with the variable resistor, and a load resistor connected in series with the variable resistor and a node providing a predetermined voltage, and a comparison circuit section controlling a driving current of the light source by comparing an output current of the resistance circuit section with a predetermined signal.

The light receiving unit may be a photodiode, the resistor parallel with the variable resistor may be a variable resistor, and the resistor parallel with the variable resistor alternatively may be a fixed resistance device. In addition, a resistance value of the resistor parallel with the variable resistor may be not larger than a maximum resistance value of the variable resistor.

Further, the node of the load resistor for providing a predetermined voltage may be connected to a power supply providing a predetermined voltage (VCC), and the automatic power controlling unit may further include a capacitor having one end connected in series with the power supply and the load resistor and the other end being connected to ground.

To achieve the above and/or other aspects and advantages, embodiments of the present invention include an optical output controller including a light source, a light receiving unit detecting light emitted from the light source and converting the detected light into a current signal, and an automatic power controlling unit receiving current from the light receiving unit and controlling an optical power output of the light source in accordance with the received current, wherein the automatic power controlling unit includes a feedback circuit having at least two current level controlling elements, each connected to an output of the light receiving unit, to control a current level of a corresponding feedback current.

The at least two current level controlling elements may include at least two current level controlling elements in parallel. In addition, one of the at least two current level controlling elements may be a variable resistance. Another of the at least two current level controlling elements may be a resistance in parallel with the variable resistance.

The automatic power controlling unit may further include a load resistor connected in series with the variable resistance and a node providing a predetermined voltage. Further, the automatic power controlling unit may further include a comparison circuit section controlling a driving current of the light source by comparing an output current of the feedback circuit with a predetermined signal.

To achieve the above and/or other aspects and advantages, embodiments of the present invention include an optical output controller including a light source, a light receiving unit detecting light emitted from the light source and converting the detected light into a current signal, and an automatic power controlling unit receiving current from the light receiving unit and controlling an optical power output of the light source in accordance with the received current, wherein the automatic power controlling unit includes a feedback circuit includes at least a variable resistance, in parallel with another resistance, connected to an output of the light receiving unit, to control a current level of a corresponding feed back current and thereby controlling the optical power output of the light source.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
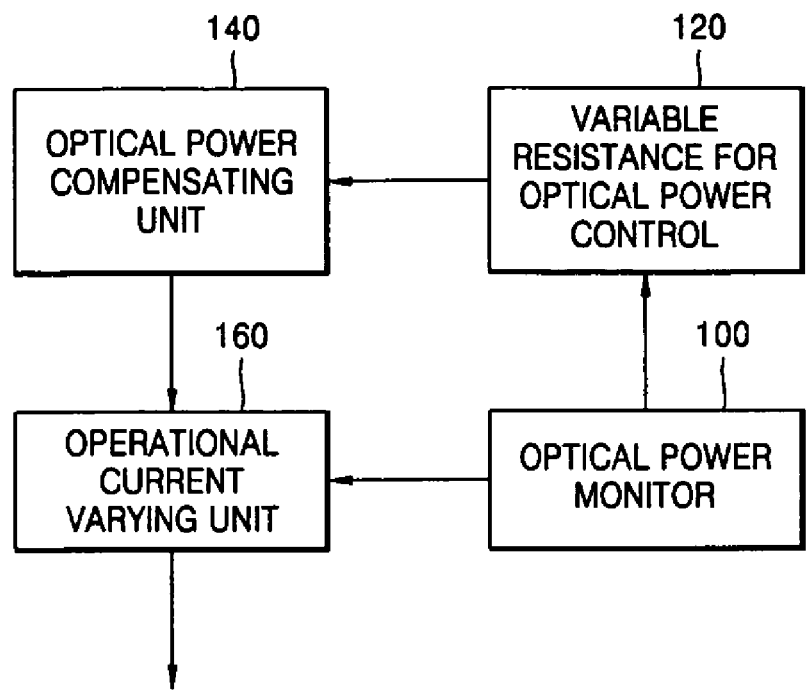
FIG. 1 illustrates a general optical control and feedback circuit.
Figure 2:
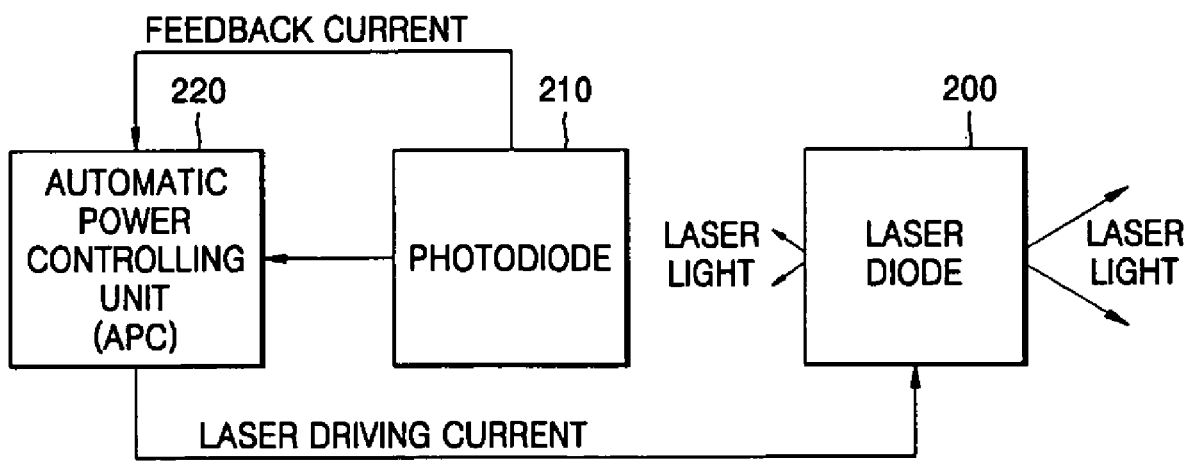
FIG. 2 illustrates a conventional configuration of an optical output controller.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
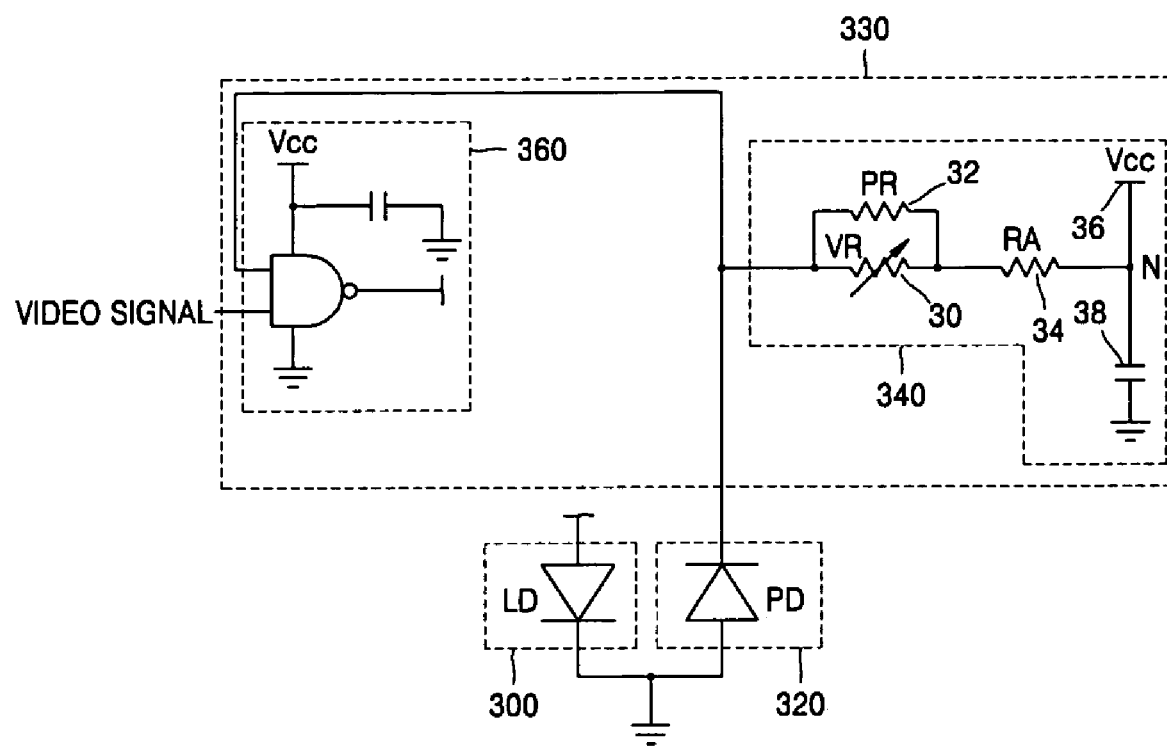
FIG. 3 illustrates a configuration of an optical output controller, according to an embodiment of the present invention.

FIG. 3 illustrates a configuration of an optical output controller, according to an embodiment of the present invention. The optical output controller can include a light source 300, a light receiving unit 320, and an automatic power controlling unit 330.

In particular, in this embodiment, the light source 300 is a laser diode that emits light in response to a predetermined driving current. The light receiving unit 320, which may be a photodiode, can detect light emitted from the light source 300 (i.e., monitoring light) and convert the received light into a current signal, using a light intensity sensor.

The automatic power controlling unit 330 receives a current signal from the light receiving unit 320, e.g., the photodiode, and then controls the optical power output of the light source 300, e.g., the laser diode, with the received current. The automatic power controlling unit 330 may include a resistance circuit section 340 and a comparison circuit section 360.

The resistance circuit section 340 controls the size of the current output from light receiving unit 320, and may include a variable resistor 30, a parallel resistor 32, and a load resistor 34. The comparison circuit section 360 controls a driving current for light source 300 by comparing the current adjusted in the resistance circuit section 340 with a predetermined signal, for example. The predetermined signal may be a video signal, for example, in a laser printer.

The parallel resistor 32 of the resistance circuit section 340 may include a variable resistor and/or a fixed resistor, and it is preferable that the resistance of the parallel resistor 32 not be larger than the maximum resistance of the variable resistor 30, though this is not necessary.

In addition, a node providing a predetermined voltage to the load resistor 34 may be connected to a power supply (VCC) 36 and a capacitor 38, for example. One end of the capacitor 38 can be connected to the power supply 36 and the load resistor 34, and the other end of the capacitor 38 may be connected to ground.

The operations protecting the optical device, which is vulnerable to an excessive change of current, will now be described. First, the laser diode (LD) corresponding to the light source 300 emits a monitoring beam toward the photodiode (PD), corresponding to the light receiving unit 320, to which a light intensity sensor (not shown) can be attached such that beams emitted toward an optical system and a state of the light source power can be monitored at any time. The monitoring beam can be sensed by the light intensity sensor of the photodiode (PD) and can be converted into a current by the photodiode (PD), with the inverted current being output. The output current can be used as a driving current controlling an output optical power of the laser diode (LD). Accordingly, when the current of the photodiode (PD) is controlled, the driving current is correspondingly changed, and thus the output optical power of the laser diode (LD) is controlled.

In particular, the resistance circuit section 340 of the automatic power controlling unit 330, which controls the optical power, can control an initial light intensity of the laser diode (LD), e.g., at the time of the manufacturing of the optical power controller, with the variable resistor (VR) 30 being attached to thereafter manually control an optical power, for example.

Here, when controlling an initial light intensity, if the required optical power specifications of a particular laser printer model are changed, as shown in Table 1, the value of the variable resistance or fixed resistance of the variable resistor (VR) 30 can accordingly be changed.

TABLE 1

| Model | Maximum variable resistance (KΩ) | Fixed resistance (KΩ) |
|---|---|---|
| A | 30 | 3.0 |
| B | 5 | 3.6 |
| C | 10 | 4.7 |
| D | 5 | 3.0 |
| E | 20 | 7.5 |
| F | 5 | 2.0 |
| G | 1 | 2.0 |

To change a monitoring current value by 0.5 mA, the value of the variable resistance can be changed by about 20 kΩ, for example. Conventionally, with respect to a model of laser printer requiring a change of the monitoring current value more than 0.5 mA, an optical device having a variable resistor with a greater capacity must be used. This means that a new circuit would have to be designed and tested, causing increased production costs. Table 2 lists results of monitoring current values, in accordance with changes in the variable resistance, when a reference optical power of the laser diode is controlled. In this table, VR corresponds to a variable resistance, and PCB Im corresponds to a monitoring current value output from the photodiode of the optical output controller.

TABLE 2

| VR (kΩ) | PCB Im (mA) |
|---|---|
| 27.8 | 0.1 |
| 16 | 0.175 |
| 14 | 0.198 |
| 12 | 0.233 |
| 10 | 0.278 |
| 4.55 | 0.6 |

In an embodiment, when a parallel resistor (PR) 32 is connected in parallel with the variable resistor (VR) 30, the current output from the photodiode (PD) 320 is divided between the variable resistor (VR) 30 and the parallel resistor (PR) 32, and thus the current flowing through the variable resistor 30 can be remarkably reduced.

This optical device protection, according to an embodiment of the present invention, can control a range of current values in inverse proportion to a ratio of resistances. For example, if in a resistance circuit, a resistance ratio of the resistance of the VR to the PR is 10 to 1, the monitoring current following through the VR and PR is divided according to the ratio of 1 to 10, or if the resistance ratio is 20 to 1, the monitoring current following through the VR and PR is divided according to the ratio of 1 to 20. That is, due to the parallel resistor functioning as a divider, the value of monitoring current becomes small, which may correspond to one-tenth or one-twentieth, for example, of a total amount of current. Therefore, such a variable resistor can deal with monitoring currents corresponding to various optical powers using a variable resistance having a small capacity.

Hence, when the monitoring current is changed, the required change in variable resistance is smaller than conventionally, when only the variable resistor is used without the parallel resistor, and thus the variable resistor does not need to be replaced, as was previously necessary.

Further, even when the maximum variable range of the variable resistance is changed, according to the optical power specification, for proper operation of a semiconductor laser, the maximum variable range of the variable resistor is decreased by adding the parallel resistor, and thus the necessity of changing the variable resistor sharply decreases.

Also, during manufacturing of the optical power controller, an operator can control the variable resistor of the optical power controller manually such that an optical device outputs the proper optical power. Here, conventionally, since the variable resistor, on its own, is very sensitive to manual handling, an excessive current may be applied temporarily, and thereby an optical device, such as a laser diode (LD), may be damaged. However, if the current is divided between the variable resistor and the parallel resistor, by adding the parallel resistor, the sensitivity of the variable resistor becomes reduced and the temporary excessive current is prevented from flowing to the optical device, such as a LD, thereby preventing the damage to the optical device.

Furthermore, in the operation of controlling an optical power, during the manufacture of a LSU (laser scanning unit) of a laser printer, for example, a resistor can be added and connected in parallel to a variable resistance device controlling an optical power manually, as part of the configuration of a feedback circuit, and the added resistor can be practically used to control an initial light intensity during the manufacture of the device.

According to an embodiment of the present invention, by using a protector for an optical device, vulnerable to an excessive change in current, even when a monitoring current value is changed, a variable resistor does not need to be replaced.

In addition, even if the maximum variable range of a variable resistance changes to match the optical power specification of a semiconductor laser, the maximum variable range of the variable resistor can be decreased by adding the parallel resistor, and thus the necessity of changing the variable resistor sharply decreases.

Further, when an operator intends to control a variable resistor of an optical power controller manually, during manufacture of the optical power controller, such that an optical device outputs a required optical power, the sensitivity of the variable resistor is reduced and a temporary excessive current is prevented from flowing to the optical device, such as a LD, thereby preventing damage to the optical device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical output controller comprising:
   a light source;
   a light receiving unit detecting light emitted from the light source and converting the detected light into a current signal; and an automatic power controlling unit receiving current from the light receiving unit and controlling an optical power output of the light source in accordance with the received current, wherein the automatic power controlling unit includes a resistance circuit section having a variable resistor connected to an output end of the light receiving unit, a resistor connected in parallel with the variable resistor, and a load resistor connected in series with the variable resistor and a node providing a predetermined voltage, and a comparison circuit section controlling a driving current of the light source by comparing an output current of the resistance circuit section with a predetermined signal.

2. The optical output controller of claim 1, wherein the light receiving unit is a photodiode.

3. The optical output controller of claim 1, wherein the resistor parallel with the variable resistor is a variable resistor.

4. The optical output controller of claim 1, wherein the resistor parallel with the variable resistor is a fixed resistance device.

5. The optical output controller of claim 1, wherein a resistance value of the resistor parallel with the variable resistor is not larger than a maximum resistance value of the variable resistor.

6. The optical output controller of claim 1, wherein the output current of the resistance circuit is distinguished from current of the variable resistor and current of the resistor connected in parallel with the variable resister.

7. An optical output controller comprising:

a light source;

a light receiving unit detecting light emitted from the light source and converting the detected light into a current signal; and an automatic power controlling unit receiving current from the light receiving unit and controlling an optical power output of the light source in accordance with the received current, wherein the automatic power controlling unit includes a resistance circuit section having a variable resistor connected to an output end of the light receiving unit, a resistor connected in parallel with the variable resistor, and a load resistor connected in series with the variable resistor and a node providing a predetermined voltage, and a comparison circuit section controlling a driving current of the light source by comparing an output current of the resistance circuit section with a predetermined signal, wherein the node of the load resistor for providing a predetermined voltage is connected to a power supply providing a predetermined voltage (VCC), and the automatic power controlling unit further comprises a capacitor having one end connected in series with the power supply and the load resistor and the other end being connected to ground.

* * * * *

UNITED STATES PATENT AND TRADEMARK OFFICE
CERTIFICATE OF CORRECTION

PATENT NO. : 7,453,053 B2
APPLICATION NO. : 11/159190
DATED : November 18, 2008
INVENTOR(S) : Yu-yong Lee Page 1 of 1

It is certified that error appears in the above-identified patent and that said Letters Patent is hereby corrected as shown below:

Column 7, Line 28, change "resister." to --resistor.--.

Signed and Sealed this

Fourteenth Day of April, 2009

JOHN DOLL
*Acting Director of the United States Patent and Trademark Office*